No. 677,698. Patented July 2, 1901.
W. H. PRINZ.
MALT DRIER.
(Application filed Feb. 11, 1901.)
(No Model.) 2 Sheets—Sheet 2.
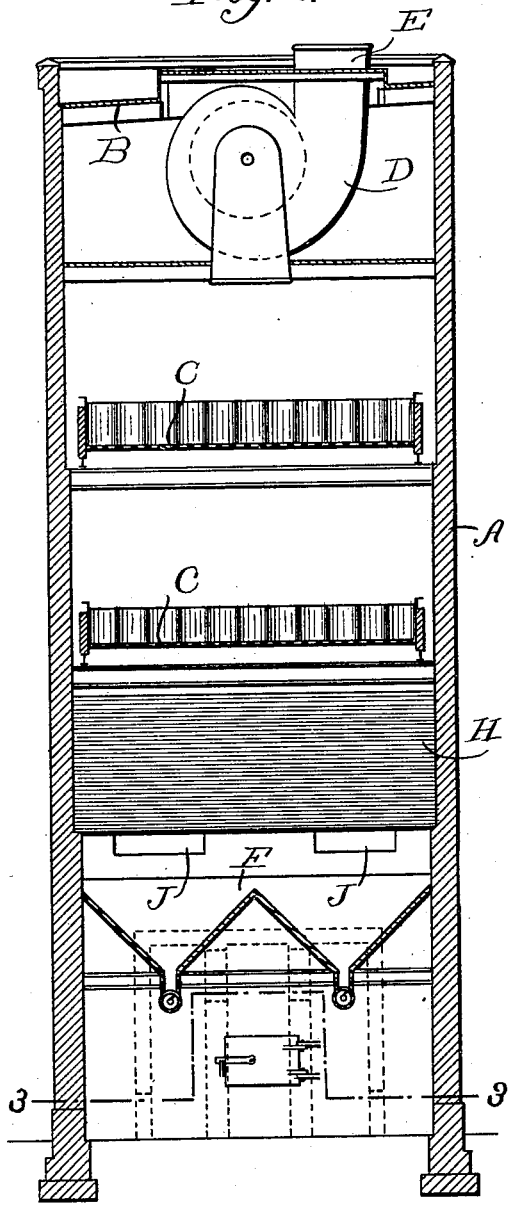
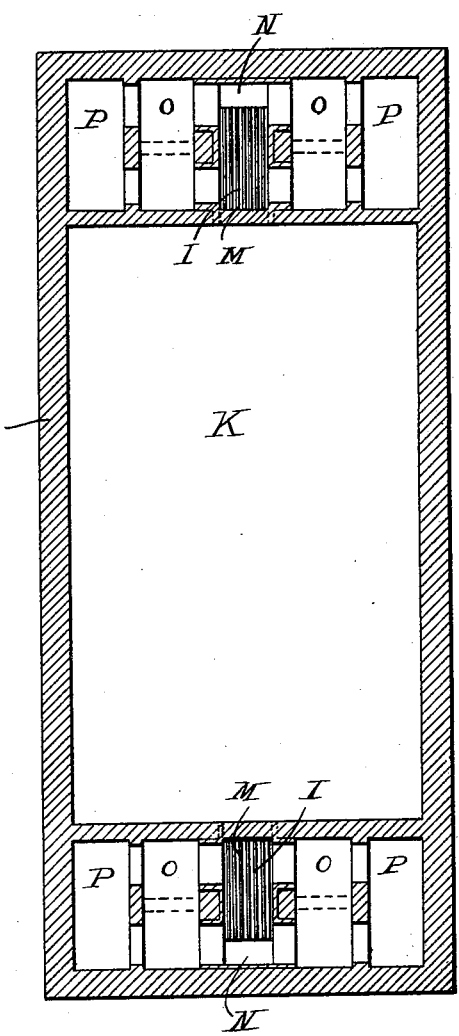

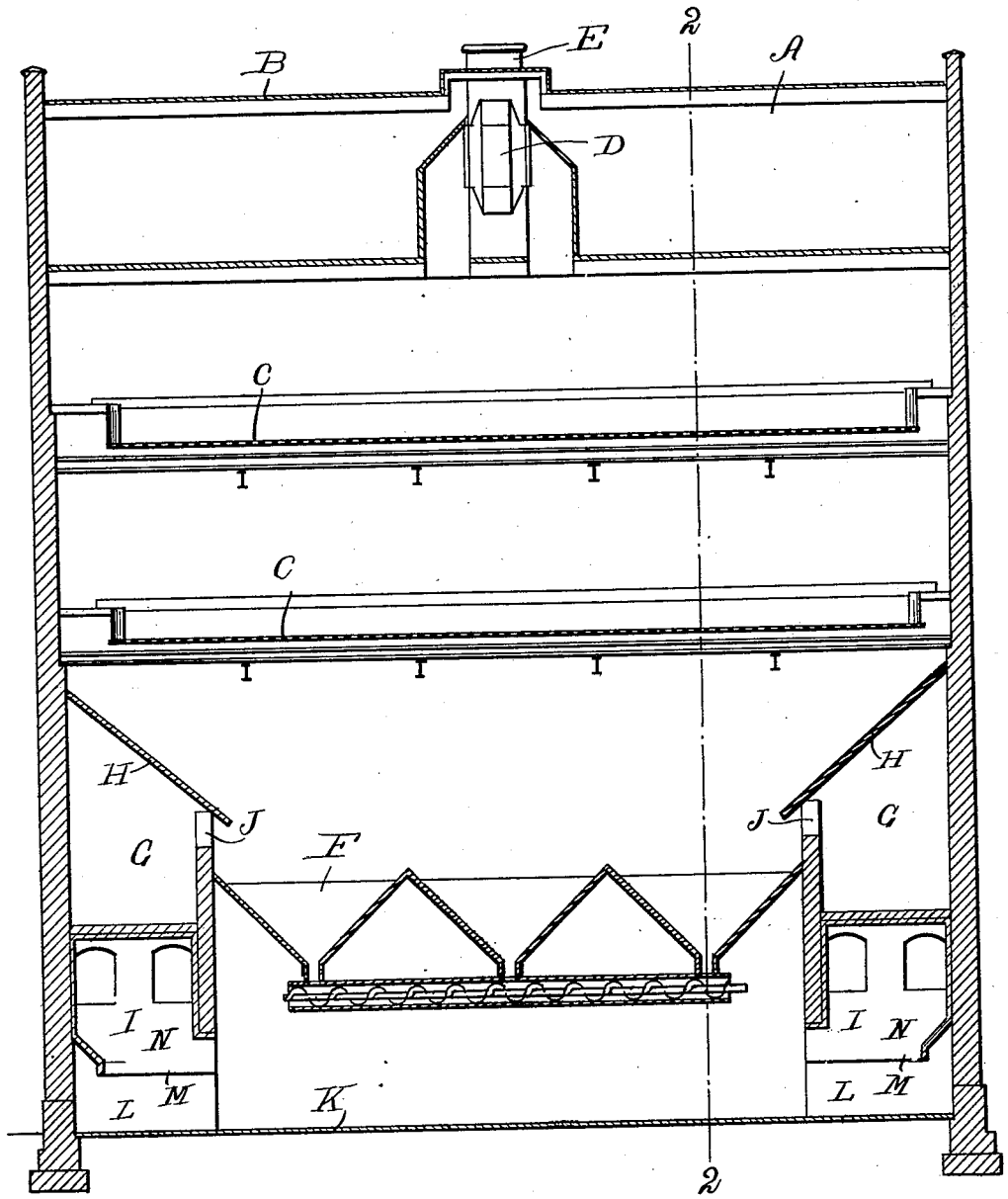

UNITED STATES PATENT OFFICE.

WILLIAM H. PRINZ, OF AUSTIN, ILLINOIS, ASSIGNOR TO THE SALADIN PNEUMATIC MALTING CONSTRUCTION CO., OF CHICAGO, ILLINOIS.

MALT-DRIER.

SPECIFICATION forming part of Letters Patent No. 677,698, dated July 2, 1901.

Application filed February 11, 1901. Serial No. 46,883. (No model.)

*To all whom it may concern:*

Be it known that I, WILLIAM H. PRINZ, a citizen of the United States, residing at Austin, in the county of Cook and State of Illinois, have invented certain new and useful Improvements in Malt-Driers; and I do hereby declare the following to be a full, clear, and exact description of the invention, such as will enable others skilled in the art to which it appertains to make and use the same.

My invention relates to a novel construction in an apparatus for drying malt, the object being to provide a cheap, simple, and efficient device of this character; and it consists in the features of construction and combinations of parts hereinafter fully described and claimed.

In the accompanying drawings, illustrating my invention, Figure 1 is a vertical longitudinal section of a malt-drier constructed in accordance with my invention. Fig. 2 is a vertical transverse section of same on the line 2 2 of Fig. 1. Fig. 3 is a horizontal section on the line 3 3 of Fig. 2.

My device consists of a rectangular building A, having a roof B and a plurality of perforated malt-floors C, upon which green malt is laid and through which hot air is passed to dry said malt. A suction-fan D is mounted immediately below the roof, the delivery end E of same projecting through said roof.

Below the lowermost malt-floor C is a hopper-floor F, comprising a plurality of hoppers mounted side by side and extending over the full width of the building and almost the entire length. At each end of said hopper-floor is a mixing or hot-air chamber G, covered by an inclined hood H, into which the hot air passes from the furnaces I. Below said hood H in the inner walls of said chambers G are openings J, through which the hot air passes into the space above said hopper-floor. Said furnaces I are mounted upon the ground floor K and comprise an ash-box L, grate M, a covered firing-chamber N, a downdraft-flue O on each side of said firing-chamber, and an updraft-flue P beyond each of said downdraft-flues O, said flue P discharging into the chamber G. This arrangement is very simple and efficient, as the construction of the hopper-floor is greatly simplified over any previous devices, thus greatly reducing the cost of the kiln. The distribution of hot air is also rendered far more uniform than heretofore, thereby improving the results obtained.

I claim as my invention—

In a malt-drier, the combination with the drying-chamber and malt-floors, of a central hopper-floor below said malt-floors, a furnace at each end of said hopper-floor, and a covered hot-air chamber above each of said furnaces and communicating with the space between said hopper-floor and the lowermost malt-floor, substantially as described.

In testimony whereof I affix my signature in presence of two witnesses.

WILLIAM H. PRINZ.

Witnesses:
RUDOLPH WM. LOTZ,
E. F. WILSON.